United States Patent
Larsson et al.

(10) Patent No.: US 6,751,200 B1
(45) Date of Patent: Jun. 15, 2004

(54) ROUTE DISCOVERY BASED PICONET FORMING

(75) Inventors: Tony Larsson, Stockholm (SE); Per Johansson, Hägersten (SE); Johan Sörensen, Eslöv (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 667 days.

(21) Appl. No.: 09/696,242

(22) Filed: Oct. 26, 2000

Related U.S. Application Data

(60) Provisional application No. 60/168,742, filed on Dec. 6, 1999.

(51) Int. Cl.⁷ .............................................. H04L 12/56
(52) U.S. Cl. ...................................... 370/255; 370/449
(58) Field of Search ................................ 370/254–258, 370/335, 449; 706/21

(56) References Cited

U.S. PATENT DOCUMENTS

| | | | |
|---|---|---|---|
| 5,051,984 A | | 9/1991 | Mostafa et al. |
| 5,056,984 A | | 10/1991 | Hesterman |
| 5,065,399 A | | 11/1991 | Hasegawa et al. |
| 5,173,689 A | | 12/1992 | Kusano |
| 5,235,599 A | | 8/1993 | Nishimura et al. |
| 5,506,838 A | * | 4/1996 | Flanagan ............... 370/258 |
| 5,699,351 A | * | 12/1997 | Gregerson et al. ........ 370/256 |
| 5,719,861 A | | 2/1998 | Okanoue |
| 5,740,366 A | | 4/1998 | Mahany et al. |
| 5,748,611 A | | 5/1998 | Allen et al. |
| 6,304,556 B1 | * | 10/2001 | Haas ...................... 370/254 |
| 6,404,752 B1 | * | 6/2002 | Allen et al. .............. 370/335 |
| 6,411,946 B1 | * | 6/2002 | Chaudhuri ................ 706/21 |
| 6,480,505 B1 | * | 11/2002 | Johansson et al. ........ 370/449 |
| 6,535,498 B1 | * | 3/2003 | Larsson et al. ........... 370/254 |
| 2002/0044549 A1 | * | 4/2002 | Johansson et al. ....... 370/255 |

FOREIGN PATENT DOCUMENTS

| | | |
|---|---|---|
| EP | 0294233 A2 | 12/1988 |
| EP | 0599764 A1 | 6/1994 |
| EP | 0715478 A2 | 6/1996 |
| EP | 0883265 A2 | 12/1998 |
| EP | 0913965 A1 | 5/1999 |
| GB | 2 229 895 A | 10/1990 |
| WO | 9911025 A1 | 3/1999 |
| WO | 9923799 A1 | 5/1999 |

OTHER PUBLICATIONS

Toh C–K: "Associativity–Based Routing for Ad–Hoc Mobile Networks", Wireless Personal Communications, NL, Kluwer Academic Publishers, vol. 4, No. 2, Mar. 1, 1997, pp. 103–139.

(List continued on next page.)

*Primary Examiner*—Salvatore Cangialosi
(74) *Attorney, Agent, or Firm*—Burns, Doane, Swecker & Mathis, L.L.P.

(57) ABSTRACT

A method for establishing a route over which data packets are to be sent from a source node to a destination node in an ad-hoc network is provided. A source having packets to send to a destination node employs a reactive routing protocol if it does not posses the route to the destination node. Initially, it may be determined whether or not the source node is a member of an existing piconet. If the source node is a member of an existing piconet, a ROUTE request message may be broadcast to the nodes of the existing piconet, while the source awaits a timely REPLY message. If the source node is not a member of an existing piconet, or if a time REPLY message is not received, the source node may initiate a new route discovery process wherein the nodes attempt to establish new piconets that enable more efficient communication between the source and destination nodes.

12 Claims, 7 Drawing Sheets

OTHER PUBLICATIONS

Haartsen J: "Bluetooth—The Universal Radio Interface for Ad Hoc, Wireless Connectivity", Ericsson Review, SE, Ericsson, Stockholm, No. 3, Jan. 1, 1998, pp. 110–117.

Takagi, Hideaki, "Queuing Analysis of Polling Models", ACM Computing Surveys, vol. 20, No. 1, Mar. 1988.

Johansson, Per, et al., "Short Range Radio Based Ad–hoc Networking: Performance and Properties", Proceedings of International Conference on Communications (ICC '99), Jun. 6–10, 1999.

"Specification of the Bluetooth System", Bluetooth SIG, vol. 0, Jul. 24, 1999; pp. 35–40 and pp. 121–122.

Albrecht, M.,et al., "IP Services over Bluetooth: Leading the Way to a New Mobility", Proceedings of the Conference on Local Computer Networks, Oct. 1999.

Tode, H., et al., "A Routing Method Using a Tunable Cost Function to Obtain Required Communication Quality and Performance", Electronics and Communications in Japan, Part 1. vol., 81, No. 5, 1998.

* cited by examiner

ROUTE DISCOVERY BASED PICONET FORMING

This application claims the benefit of provision application No. 60/168,742, filed Dec. 6, 1999

CROSS-REFERENCE TO RELATED APPLICATIONS

This application is related to the following co-pending applications: U.S. patent application Ser. No. 09/455,168 "Route Updating In Ad-Hoc Networks"; now U.S. Pat. No. 6,535,498 U.S. patent application Ser. No. 09/455,460 "Broadcast as a Triggering Mechanism for Route Discovery in Ad-Hoc Networks"; now pending U.S. patent application Ser. No. 09/454,758 "Inter Piconet Scheduling"; now pending and U.S. patent application Ser. No. 09/455,172 "Batched Fair Exhaustive Polling Scheduler", now U.S. Pat. No. 6,480,505 all of which are expressly incorporated by reference herein.

FIELD OF THE INVENTION

The present invention relates to the field of telecommunications. More particularly, the present invention relates to the field of ad-hoc network telecommunications.

BACKGROUND

"Bluetooth" is an example of an ad-hoc wireless network technology that uses a frequency hopping scheme in the unlicensed 2.4 Ghz ISM (Industrial-Scientific-Medical) band. The original intention of Bluetooth was to eliminate cables between devices such as phones, PC-cards, wireless headsets, etc., in a short-range radio environment. Today, however, Bluetooth is a true ad-hoc wireless network technology intended for both synchronous traffic, e.g., voice and asynchronous traffic, e.g., IP based data traffic. The aim is that any digital communication device such as telephones, PDAs, laptop computers, digital cameras, video monitors, printers, fax machines, etc. should be able to communicate over a radio interface through the use of a Bluetooth radio chip and its accompanying software.

FIGS. 1A–C illustrate three exemplary Piconets. In accordance with, the Bluetooth technology, two or more Bluetooth (BT) units sharing the same channel form a piconet. Within a piconet, a BT unit can be either a master or a slave, although each piconet must have only one master and up to seven active slaves. Any BT unit can become a master.

FIG. 2 illustrates a scatternet. A scatternet is formed through the interconnection of two or more piconets. Two or more piconets connect with each other through a commonly shared BT unit, that is a member of each piconet. BT unit 205 is an example of a BT unit that is shared by three piconets 1, 2 and 3.

FIG. 2 further illustrates that a BT unit, which is shared by two or more piconets, may be a slave unit in several piconets, but a master unit in only one piconet. For example, BT unit 210 is the master unit in piconet 10, but only a slave unit in piconet 11 and 12. In addition, a BT unit that is a member of two or more piconets may transmit and receive data in one piconet at a time. Accordingly, participation in multiple piconets has to be on a time division multiplex basis. It should be noted that there is no direct transmission between slaves, only between master and slave and vice versa.

Each BT unit has a globally unique 48-bit IEEE 802 address. This address, called the Bluetooth Device Address (BD_ADDR), is assigned when the BT unit is manufactured, and it never changes. In addition, the master of a piconet assigns a local, Active Member Address (AM_ADDR) to each active member of the piconet. The AM_ADDR, which is only three bits long, is dynamically assigned and deassigned and is unique only within a single piconet. The master uses the AM_ADDR to poll a particular slave in the piconet. When the slave, triggered by a polling packet from the master, transmits a packet to the master, it includes its own AM_ADDR in the packet header.

Though all data is transmitted in packets, the packets may contain synchronous data, on SCO links, which is primarily intended for voice traffic, and/or asynchronous data, on Asynchronous Connectionless (ACL) links. If the packet contains asynchronous data, an acknowledgment and retransmission scheme is used to ensure reliable transfer of data, as is forward error correction (FEC) in the form of channel coding.

FIG. 3 illustrates the standard format of a Bluetooth packet, although there are exceptions for certain control packets. The AM_ADDR is located in the packet header, followed by control parameters (e.g., a bit indicating acknowledgment or retransmission request, when applicable, and a header error check (HEC) code.

The format of the payload depends on the type of packet. The payload of an ACL packet consists of a header, a data field and, in most instances, a cyclic redundancy check (CRC) code. The payload of an SCO packet only contains a data field. In addition, there are hybrid packets that include two data fields, one for synchronous data and one for asynchronous data. Packets which do not include a CRC are neither acknowledged nor retransmitted.

FIG. 4 illustrates the protocol layers of a Bluetooth system. The Baseband, LMP and L2CAP are existing Bluetooth specific protocols, the "high level protocol or application" layer represents protocols that may or may not be Bluetooth specific, while the Network layer does not currently exist in the current Bluetooth specifications.

A significant limitation associated with Bluetooth is that there is no defined method for addressing and routing packets from a BT unit in one piconet to a BT unit in another piconet. In other words, the current Bluetooth specification does not specify how inter-piconet communication is performed in a scatternet.

An important capability in any ad-hoc networking technology is the neighbor discovery feature. This is also true for Bluetooth. Without a neighbor discovery capability, a BT unit can not find other BT units with which to communicate, and consequently, no ad-hoc network would be formed. The neighbor discovery procedure in Bluetooth involves an INQUIRY message and an INQUIRY RESPONSE message. A BT unit wanting to discover neighboring BT units within radio coverage will, according to well specified timing and frequency sequences, repeatedly transmit INQUIRY messages and listen for INQUIRY RESPONSE messages. An INQUIRY message consists of only an Inquiry Access Code. The Inquiry Access Code can be a General Inquiry Access Code (GIAC), which is sent to discover any BT unit in the neighborhood, or a Dedicated Inquiry Access Code (DIAC), which is sent to discover a certain type of BT unit, for which a particular DIAC is dedicated.

A BT unit receiving an INQUIRY message, whether it contains a GIAC or a DIAC responds with an INQUIRY RESPONSE message. The INQUIRY RESPONSE message is, in actuality, a Frequency Hop Synchronization (FHS) packet. Bluetooth uses FHS packets for other purposes, e.g., for synchronization of the frequency hop channel sequence, as the name suggests. In any event, by listening for INQUIRY RESPONSE messages, the BT unit that initiated the INQUIRY can collect the BD_ADDR and internal clock values, both of which are included in the FHS packet, of the neighboring BT units.

Related to the INQUIRY procedure is the PAGE procedure. A PAGE procedure is used to establish an actual connection between two BT units. Once the BD_ADDR of a neighboring BT unit is known, as a result of an INQUIRY procedure, the neighboring BT unit can be paged with a PAGE message. Knowing the internal clock value of the BT unit being paged speeds up the PAGE procedure, since it is possible for the paging unit to estimate when and on what frequency hop channel the neighboring BT unit will listen for PAGE messages.

A PAGE message consists of the Device Access Code (DAC), derived from the BD_ADDR of the paged BT unit. A BT unit receiving a PAGE message that includes its DAC, responds with an identical packet. The paging BT unit then replies with an FHS packet, including the BD_ADDR of the paging BT unit, the current value of the internal clock of the paging BT unit, the AM_ADDR assigned to the paged BT unit and other parameters. The paged BT unit then responds once again with its DAC, and the connection between the two BT units is established.

If the paging BT unit is already the master of an existing piconet, the paged BT unit joins the existing piconet as a new slave unit. Otherwise, the two BT units form a new piconet with the paging BT unit as the master unit. Since the INQUIRY message does not include any information about its sender, the BT unit initiating the INQUIRY procedure is the only one that can initiate a subsequent PAGE procedure. Thus, the BT unit initiating an INQUIRY procedure will also be the master of any piconet that is formed as a result of a subsequent PAGE procedure. However, if considered necessary, the roles of master and slave can be switched using a master-slave-switch mechanism in Bluetooth. This, however, is a complex and extensive procedure resulting in a redefinition of the entire piconet which may involve other slave units in the piconet.

The INQUIRY and PAGE procedures are well specified in the current Bluetooth standard. These are all the tools that are needed to form a new Bluetooth piconet or to add a new BT unit to an existing piconet. However, even though these tools are well specified, there are no rules or guidelines as to how to use them. When neighbors are discovered, there is no way to know with whom to connect in order to form an appropriate piconet. Moreover, even if the master-slave-switch mechanism exists, using it is an extensive procedure, as stated, and it is hard to know when to use it in order to improve the efficiency of a piconet. Hence, piconets will more or less form at random, often resulting in far from optimal piconet and scatternet structures. An exception is when the BT unit initiating the INQUIRY procedure already knows the BD_ADDR of the BT unit it wants to connect to.

An important aspect of Bluetooth is the ability to support IP on top of the Bluetooth protocol stack. There are currently two proposals for achieving this. The first proposal regards each piconet as an IP subnet, and runs IP on top of L2CAP in each piconet. The second proposal regards an entire Bluetooth scatternet as an IP subnet. This requires that an adaptation layer, herein referred to as the Network Adaptation Layer (NAL), be inserted between L2CAP and the IP layer, as illustrated in FIG. 5. The purpose of the NAL is to emulate a shared medium network (i.e., a broadcast medium) which is assumed by the IP layer.

The first proposal suffers from a number of problems, due, in part, to the fact that Bluetooth piconets are not shared medium networks. The second proposal is of course, not without problems, but it seems to be a more promising approach. The present invention is applicable to the second proposal. Accordingly, the present invention assumes protocol layers as illustrated in FIG. 5, which includes a NAL.

The NAL layer has to support a number of features. For instance, it must support a routing mechanism to route packets within a scatternet while causing the scatternet to emulate a single shared medium network which is assumed by the IP layer. Regardless of the routing scheme used to route packets through the scatternet, the scheme must rely on BT units that are members of more than one piconet to forward packets from one piconet to another. These BT units are referred to herein below as forwarding nodes.

In general, routing protocols can be classified as proactive or reactive. A proactive routing protocol maintains routes between nodes, even if the route is not currently needed. Proactive routing protocols react to network topology changes even if no traffic is affected by the topology change. Proactive routing protocols are very costly in terms of overhead, because every node must periodically send out control information to other nodes in the network.

An alternative approach is to use reactive routing. In accordance with reactive routing, routes are established only when there is an explicit need to route packets to a particular destination. This means that the routing protocol only keeps track of routes that actually are needed for sending data. Therefore, there is less cost in terms of overhead to maintain the routes.

To establish a route from a source to a destination, the source node typically broadcasts a REQUEST message which requests a route to a stated destination. All nodes that are within range receive this REQUEST message. A node that receives the REQUEST message but is neither the destination node or a node with a valid route to the destination node, will rebroadcast the REQUEST message to its neighbors. When the destination node, or a node with a valid route to the destination node receives the REQUEST message, it limits network flooding by not rebroadcasting the REQUEST message, and it sends a Unicast REPLY message back to the source node.

Typically, the source node uses the first reply message received, and it only requests a new route when the actual route breaks. The routing can be accomplished according to one of the following disciplines. First, there is source routing, where the entire route is received in the REPLY message. No information is needed in the intermediate nodes, only the source needs to keep track of the route. The entire route is specified in every packet sent. The second involves a distance vector, which means that the REPLY message stores information in the routing tables of the intermediate nodes. This means that only the destination is needed in sent packets.

The Bluetooth specification, as stated, has the INQUIRY and PAGE procedure to establish piconets, but it fails to describe how these can be used to form efficient scatternets. Moreover, current solutions do not provide a procedure for nodes that have packets to send to a destination, wherein these nodes are not members of any piconet.

SUMMARY OF THE INVENTION

These and other problems, drawbacks and limitations associated with present techniques are overcome according to the present invention, wherein a source node in a telecommunications network (i.e., a node from which a packet is sent) can form one or more new network connections based upon predetermined events.

Accordingly, it is an objective of the present invention to allow reactive ad-hoc routing protocols to determine whether new network connections are to be made in order to form a route between the source node and the destination node.

It is another objective of the present invention to provide means for a source node in a network, upon the occurrence of a predetermined event, to create new network connections in forming a route between the source node and the destination node.

In accordance with one aspect of the present invention, the foregoing and other objectives are achieved by a method in a communications network for establishing a route over which data packets are to be sent from a source node to a destination node. The method involves requesting route discovery between the source node and the destination node over existing network connections. Ultimately, a determination is made as to whether the request for route discovery has failed. If the request for route discovery failed, a route between the source node and the destination node is formed by creating one or more new network connections.

BRIEF DESCRIPTION OF THE DRAWINGS

The objects and advantages of the invention will be understood by reading the following detailed description in conjunction with the drawings in which.

DETAILED DESCRIPTION OF THE INVENTION

Since Bluetooth is the main target, the invention will be described in a Bluetooth context using Bluetooth terminology. However, it will also be briefly described how the invention can be generalized to be applicable also to other network technologies, both wired and wireless.

In general, the present invention couples reactive routing with piconet forming. The present invention accomplishes this as described herein below.

A source having packets to send to a destination node will employ the reactive routing protocol if it does not possess the route to the destination node. It is through the reactive routing protocol that the source nodes obtain the route, however, different actions will be taken depending upon whether the source node is a member of one or several existing piconets, or is not a member of any piconet.

Figure 1:
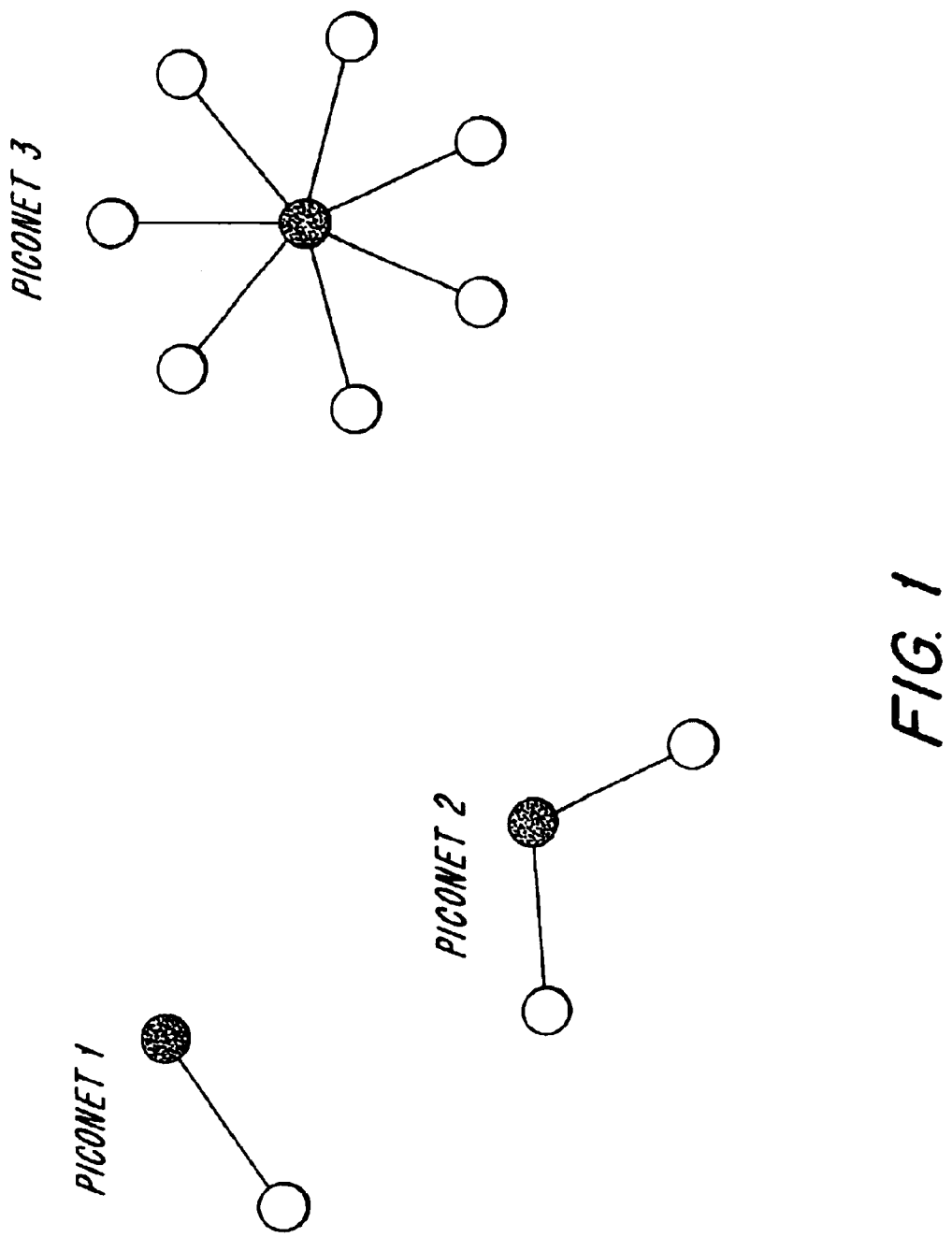
FIGS. 1A–C Illustrate three exemplary piconets.
Figure 2:
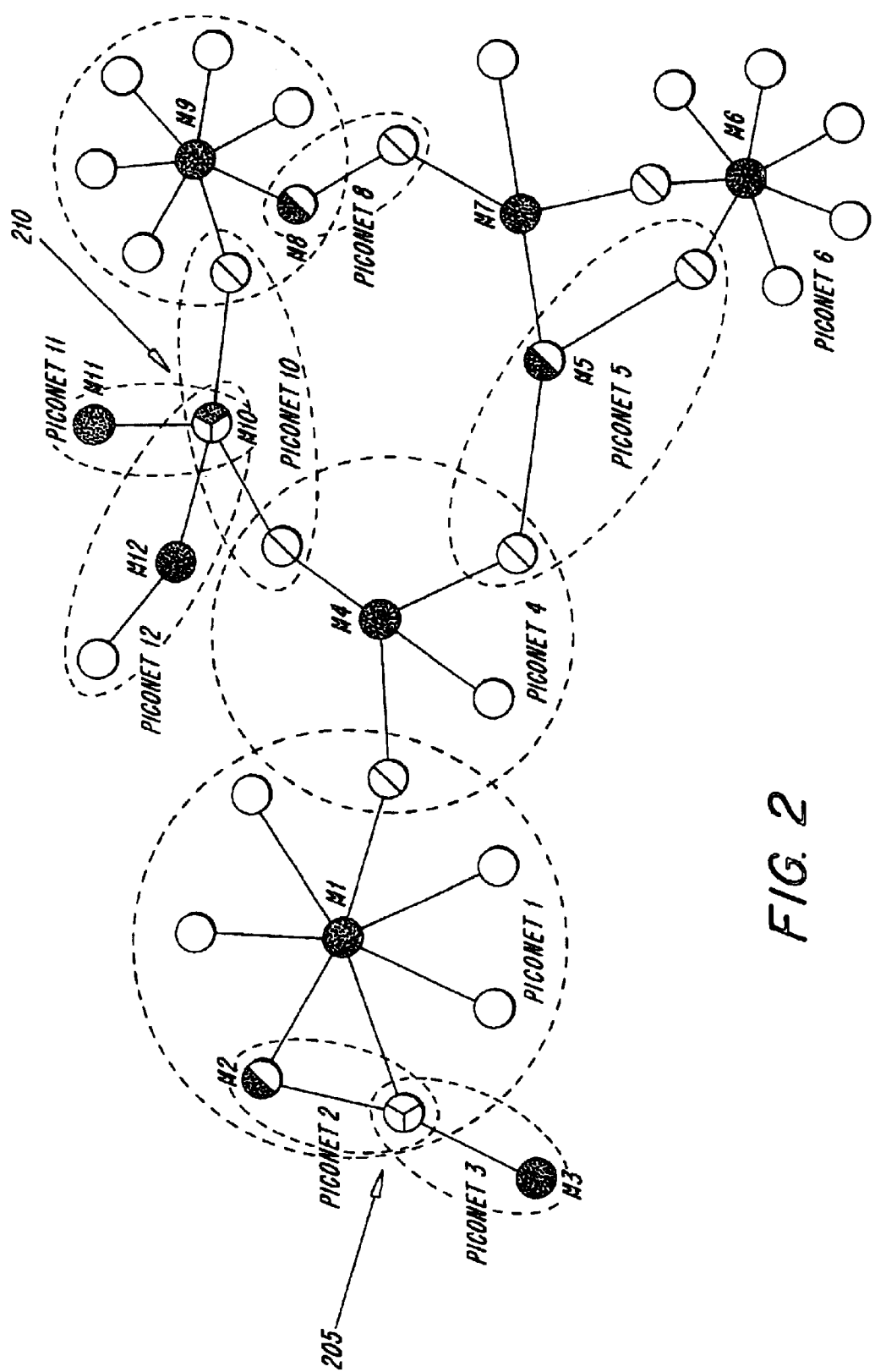
FIG. 2 illustrates an exemplary scatternet.
Figure 3:
FIG. 3 illustrates a standard format for a Bluetooth data packet.
Figure 4:
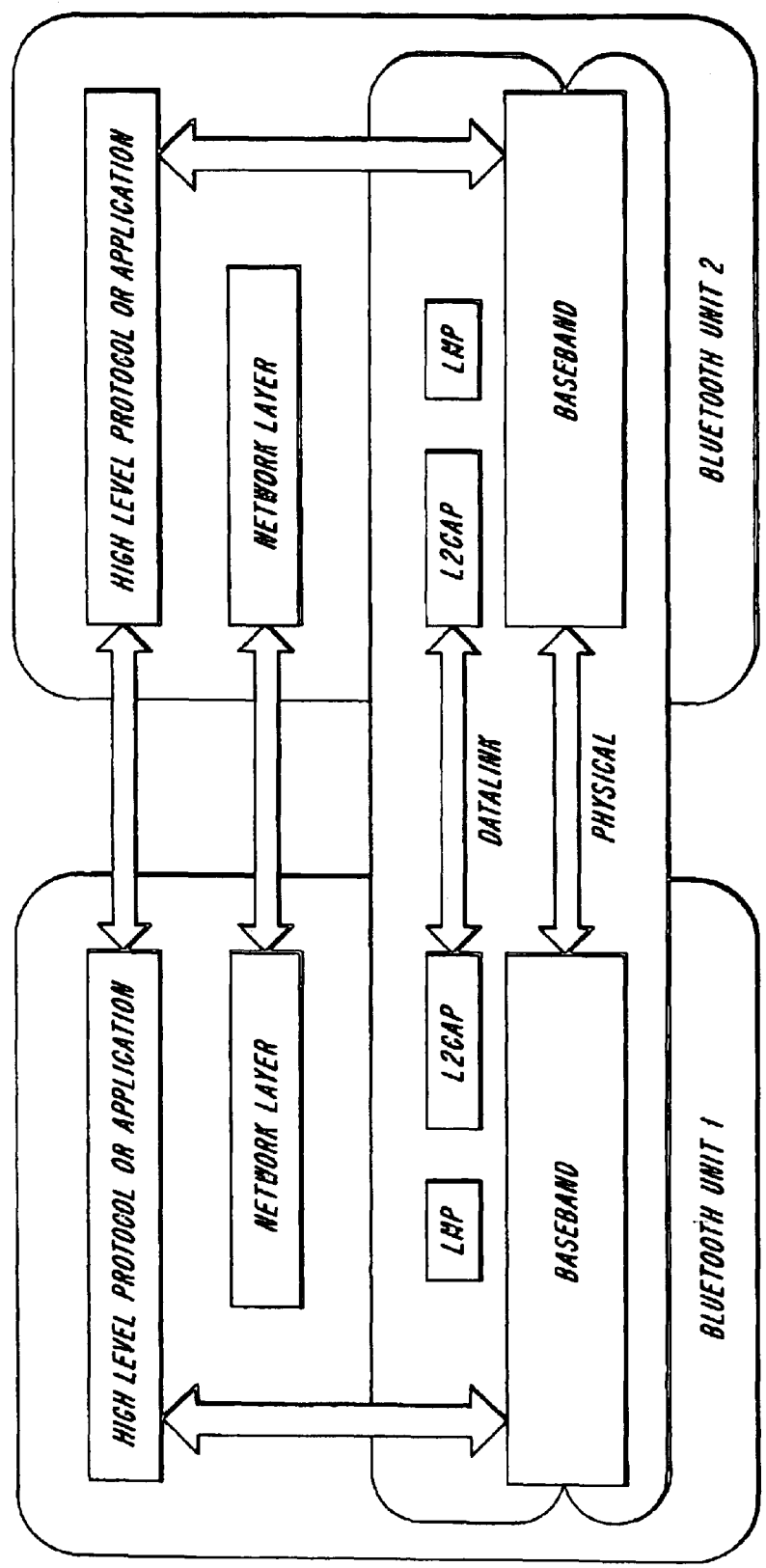
FIG. 4 illustrates the protocol layers associated with a Bluetooth based network.
Figure 5:
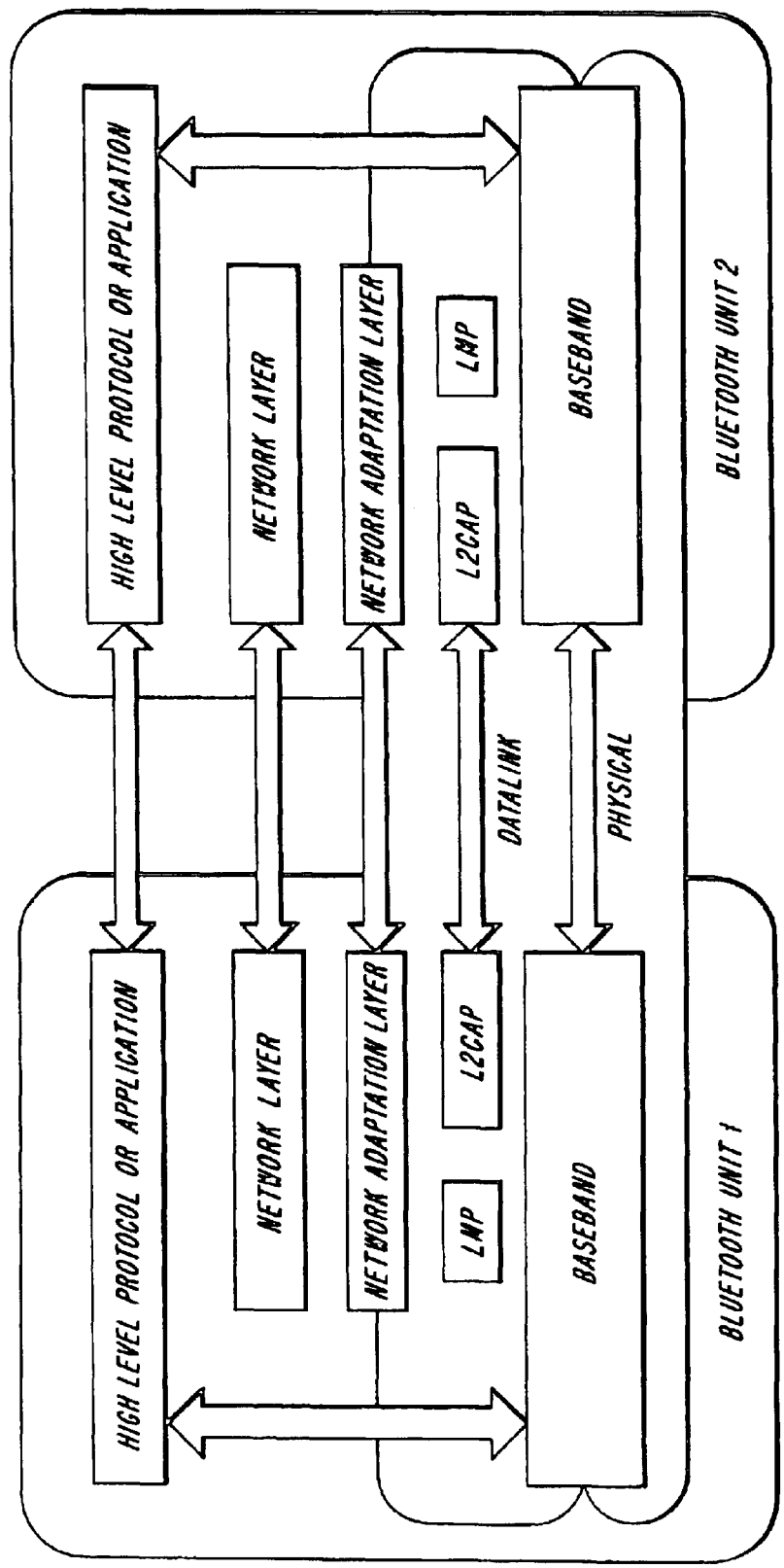
FIG. 5 illustrates the protocol layers associated with a Bluetooth based network including a Network Adaptation Layer.
Figure 6:
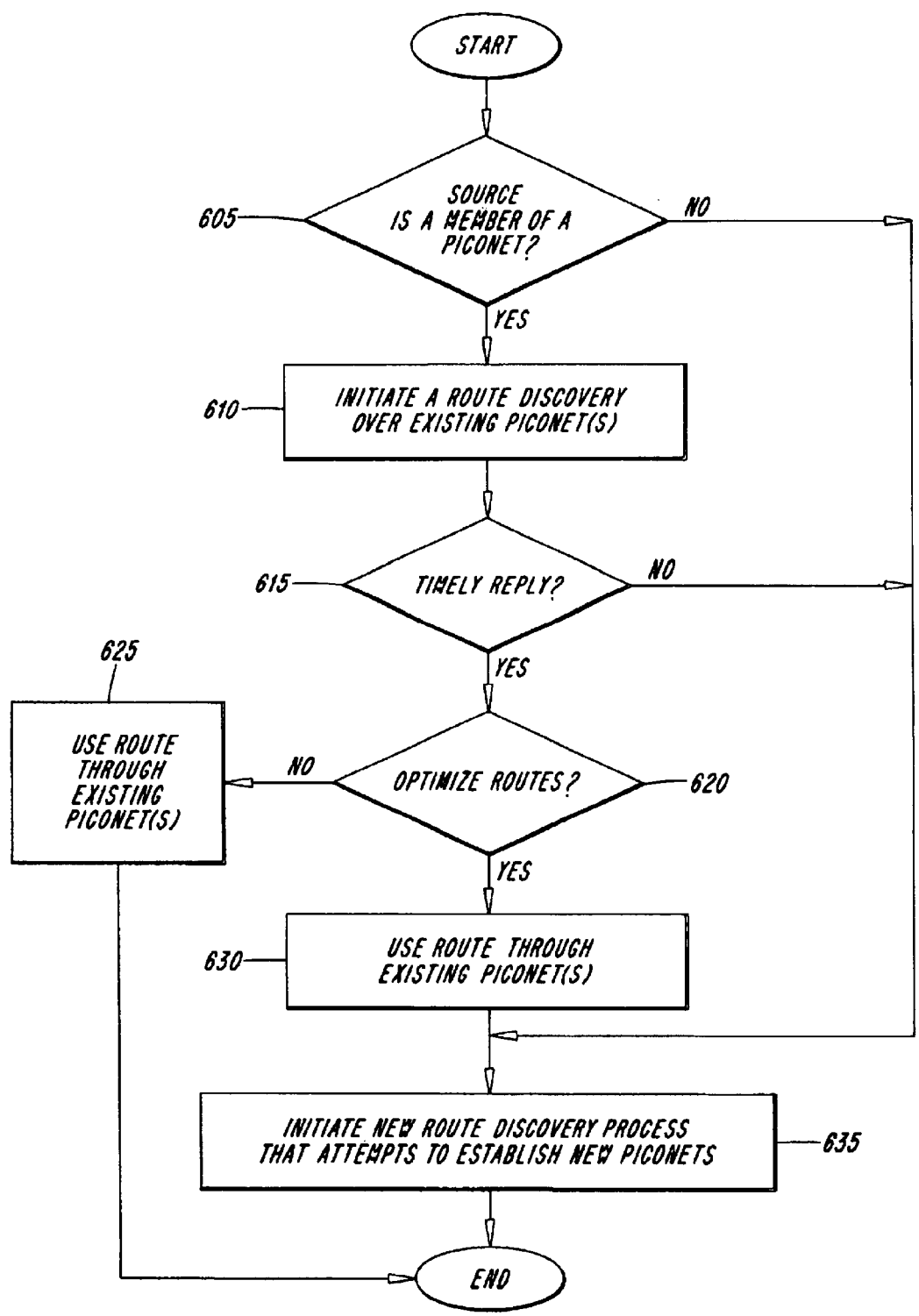
FIG. 6 illustrates a technique for accomplishing route discovery in accordance with exemplary embodiments of the present invention.

FIG. 6 illustrates a technique in accordance with an exemplary embodiment of the present invention. Initially, as shown in step 605, it is determined whether the source node is a member of an existing piconet. If the source node is not a member of an existing piconet, in accordance with the "NO" path out of decision step 605, the technique proceeds to step 635, which is described in detail below. If, however, the source node is a member of an existing piconet, in accordance with the "YES" path out of decision step 605, the source node initiates a route discovery over existing piconets, as shown in step 610. Of course, this is achieved by broadcasting a ROUTE request message to nodes connected through existing piconets.

As shown in step 615, the source node then awaits a timely REPLY message. If a timely reply is not received in accordance with the "NO" path out of decision step 615, the procedure, once again, proceeds to step 635. If, instead, a timely reply is received in accordance with the "YES" path out of decision step 615, the source node then determines whether it wishes to send its packets over the route defined by the REPLY message.

The source node may determine that it is more efficient to send its packets to the destination node along the route defined in the REPLY message, in accordance with the "NO" path out of decision step 620. If this is the case, the source node will do so as indicated in step 625. The source node may, in contrast, determine that it is necessary to optimize the route, that is, define a new, more efficient route, in accordance with the "YES" path out of decision step 620. If this is so, the source node may begin sending packets over the route defined by the REPLY message, as shown in step 630. However, simultaneously, the source node initiates a new route discovery process in accordance with step 635, wherein the nodes will attempt to establish new piconets that will enable more efficient communication between the source and destination nodes. Assuming a more efficient route can be established, the source node will begin sending packets over the route of the newly formed piconet(s). Thus, as one skilled in the art will readily appreciate, route discovery, in accordance with the present invention, influences the formation of new piconets.

The reason why it may not be best to immediately start with the establishment of new piconets is that piconet establishment is a relatively slow process, which could take longer than actually receiving a REPLY message with a valid route to the destination over an existing piconet(s). Thus, the source node may get a route much faster if the destination node is reachable through already existing piconets. Nothing prohibits, however, the nodes from reforming piconets after the first successful route establishment. Another reason is that piconet forming during route discovery can lead to a lot of unnecessary piconets that needs to be maintained and included in the scheduling of the piconets.

Use of Existing Piconets

As stated, if the source node is a member of one or several existing piconets, it will trigger the routing protocol to send out an ordinary ROUTE REQUEST message that floods the network. Thus, the route request packet only floods existing piconets. In a worst case scenario, however, the destination node may be unreachable because, for example, it is not a member of any existing piconet, or the destination node is only a member of a piconet that does not have any connections that makes it possible for the source node to communicate with the destination node. In fact, the source and destination nodes can be within each other's transmitter range, but the necessary piconets simply have not been created yet.

Figure 7:
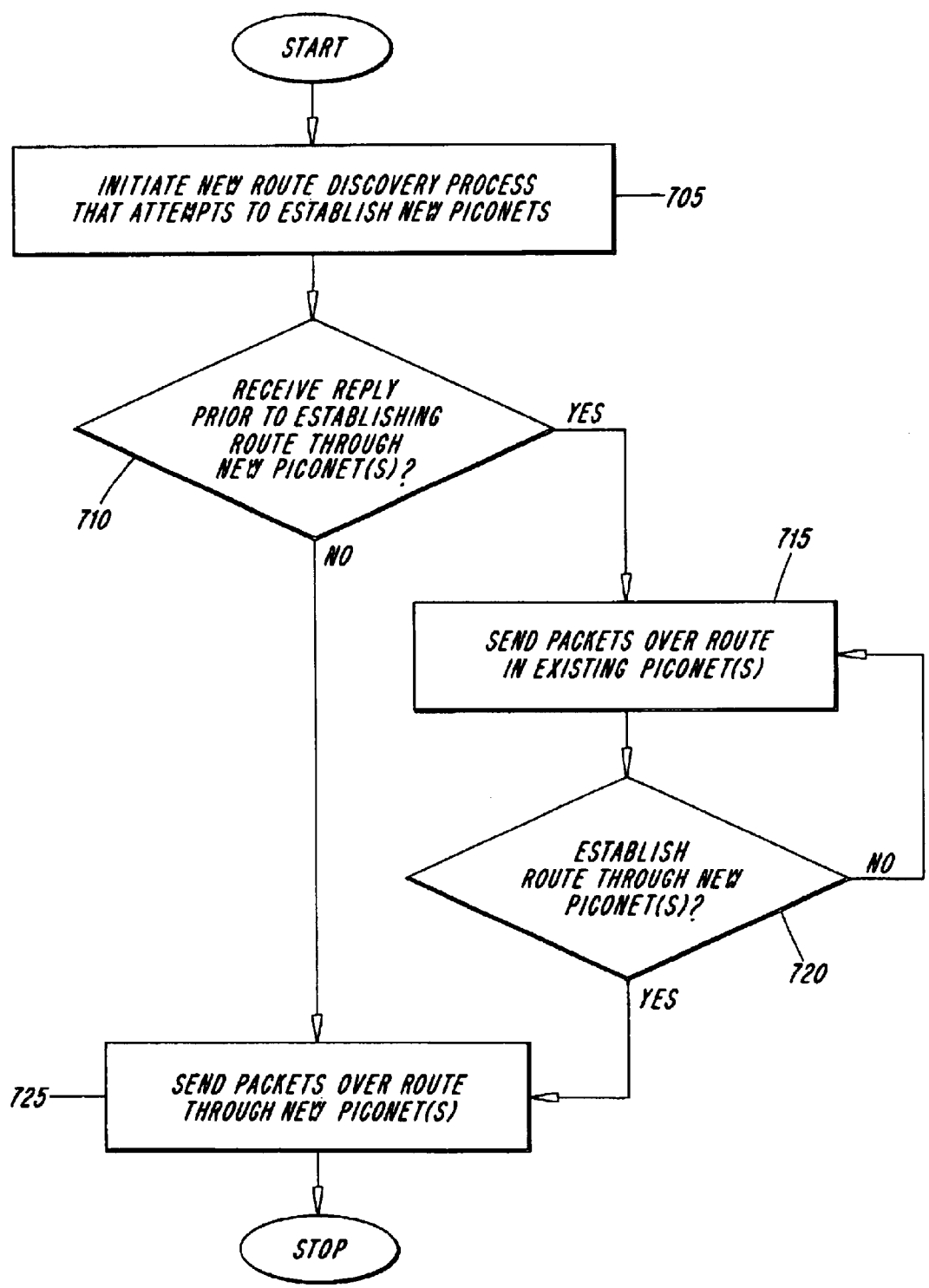
FIG. 7 illustrates an alternative technique for accomplishing route discovery in accordance with exemplary embodiments of the present invention.

FIG. 7 illustrates an alternative embodiment of the present invention. As shown, the source node may, after failing to receive a timely REPLY message (e.g., in accordance with the "NO" path out of decision step 615 in FIG. 6), immediately initiate a new route discovery process through the formation of new piconets, according to step 705. However, if a REPLY message, in response to the original ROUTE REQUEST message is received prior to establishing a route through a new piconet, in accordance with the "YES" path out of decision step 710, even though the REPLY message is not timely, the source node may begin transmitting packets to the destination node over the route defined by the non-timely REPLY message, as shown in step 715. This will continue in accordance with the "NO" path out of step 720, until a more efficient route is established through a newly formed piconet, or all the packets have been transmitted to the destination node.

Creation of New Piconets

As explained above, the present invention allows for new piconets to be established while the routing tries to find a route to the desired destination. This occurs when the route request on existing piconets fails, or the source node is not a member of any existing piconet.

To notify nodes that receive the request that they are allowed to establish new piconets, a special request is needed. This may be accomplished using a one-bit indication in the header of the REQUEST message packet. The request will be special in the sense that it will inform other nodes that they can establish new piconets if they desire to do that. Nodes that receive the request have a few options. First, they may rebroadcast the request on existing piconets while piconet establishment takes place. When the new piconets are established, the request will be sent on those nets as well. This can take place continuously, meaning that the request will be sent on each new piconet in the same rate as they are created. Second, they may form new piconets and then re-broadcast the request. Alternatively, they may only rebroadcast on existing piconets. The last statement is needed since it cannot be required that other BT units waste resources by establishing new piconets on behalf of another BT unit. A node can also decide by itself if it is willing to accept piconet establishment (PAGE RESPONSE to a PAGE) from some other node or not.

The concept of forming new piconets, while doing route discovery, will in principle result in piconets in such a way that the source node can reach all other nodes in the network. The source node will thus get a route to the destination if the destination can be reached at all.

The actual piconet establishment procedure means that the nodes (source node and nodes forwarding the request) must enter an INQUIRY mode to scan the environment (other nodes have to be in INQUIRY scan mode), i.e., neighbor discovery. The node will get a number of responses from nodes in the neighborhood. The node can thereafter make some sort of smart decision as to which nodes it should connect to, and how the new piconets should be formed. The nodes have the option to create entirely new piconets or to integrate into already existing piconets. This is dependent on how much information is available to the node. This could include information such as piconet member addresses, which piconet nodes are capable of forwarding packets, whether nodes are slaves, masters or both, and whether nodes are a member of more than one piconet.

When the smart decision is made, the node will actually make the connection by entering PAGE mode and sent a PAGE packet to the node that it wants to connect to. By default it will be the master in the new piconet, but can chose to do a master/slave switch to change roles. The node will do this with all nodes that it wants to establish a piconet with. The result will be a number of new piconets and/or reformation of already existing piconets.

Higher Protocol Layer Broadcasts

The technique described above will work as explained when the source node has knowledge about the destination BD_ADDR address. However, there will be some differences if used in conjunction with higher protocol level broadcasts (e.g., ARP and DHCP) which are handled by protocols above the NAL, and especially when it is used with Broadcast Triggered Route Discovery, as described in co-pending U.S. patent application Ser. No. 09/455,460. The main difference is that the destination address is a broadcast address, not a specific node address. This means that the previous described procedure will differ somewhat, as described herein below.

As before, the source node will first try the request on existing piconets, but in this case, it will piggyback the broadcast data in the route request packet and buffer that information in the source node. The information must be buffered to be able to request the route some time later.

The timeout feature will also be somewhat different. A route request for a node with known BD_ADDR address will timeout if a route to that destination is not received within some predetermined time. In the broadcast scenario however, this will not work because of the fact that the route request will not contain a specific destination BD_ADDR address, but a broadcast address. The solution is to keep track of higher level broadcasts at the source. The response to these broadcast is a route reply with piggybacked data (route reply will be a piggyback route reply). The source node can thus timeout if no piggyback route reply is received and initiate the route request procedure that is allowed to form new piconets.

There is however one issue associated with this solution that needs to be addressed, and that is how to map a piggyback request with the correct piggyback reply. NAL is independent of higher level protocols and can not use information from those layers. The problem lies in the fact that not even the destination can map the correct request to the correct reply. The solution to this is to only allow one broadcast triggered route request that piggybacks data at a time per node. This means that the nodes can easily map the reply to the correct request (one-to-one mapping). This solution will thus limit the number of broadcasts that are allowed to create new piconets. It must also be noted that it is unnecessary to have multiple broadcasts creating piconets at the same time anyway. Alternatively, higher level broadcasts can be prevented from establishing piconets, e.g., only use ordinary route requests that the data is piggybacked on.

If no reply with piggybacked data is received, trigger the second phase, e.g., piggyback the broadcast data on a new route request, but this time allow piconet forming.

These kinds of higher level broadcasts, that are allowed to form new piconets, must be limited in number, e.g., there must be some time interval that determines how often a node should be able to do this. The reason is simply to limit the number of unnecessary broadcasts. There is no gain to send multiple broadcasts that are allowed to form piconets if the time interval between the broadcasts is too small.

Data Packet Handling

What should be done with all data packets delivered to the routing protocol, while the routing protocol is searching for a route to route the packets to? There are essentially two alternatives. First, packets may be buffered and then sent as soon as a reply is received with a valid route. The buffer will be limited in size, and it will use a FIFO policy to decide which packets to drop when the buffer becomes full. Second, packets may be dropped and the higher layers, like TCP, permitted to handle it.

This issue is important both in the case where the request message uses existing piconets as well as the case where new piconets are established. The difference is however that the timescale is different between the two cases. It will take much longer to route if it is necessary to establish new piconets.

In the case where a node uses the described mechanism for broadcasts, the node must buffer the data from higher layers, e.g., the data to be piggybacked on the request. This to ensure that the node can try the request again.

While the main target of the invention is a Bluetooth scatternet, the present invention is not limited to such a system. In general, the target system of the invention is a digital packet based (wired or wireless) communications system comprising multiple networks. Each of the network consists of multiple nodes interconnected by point-to-point links. Forwarding in the network is performed on the network layer or on an adaptation layer between the link layer and the network layer and is based on routing information included on the same respective layer. The routing protocol used in such a system is an on-demand protocol that finds routes on a an as-needed basis, using request and reply messages. The invention provides mechanisms that nodes should take when they want a route to some destination.

The two-step process can be summarized as follows. First, the routing protocol will be triggered when a node needs to route packets to some destination node. The source node will flood the network with a ROUTE REQUEST message. The important aspect here is that the first route request will only be flooded to nodes in existing networks. The nodes that are not part of any network will not receive the message. The node will flood the network with a new route request if the first route request fails. This new route request is special in the sense that it can connect new nodes to existing networks. The source will thus get a route to the destination, if the destination can be reached.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a telecommunications network, a method for establishing a route over which data packets are to be sent from a source node to a destination node comprising the steps of:

requesting route discovery between the source node and the destination node over existing network connections;

determining whether said request for route discovery between the source node and the destination node over existing network connections fails; and establishing a route between the source node and the destination node by forming one or more new network connections if it is determined that said request for route discovery between the source node and the destination node over existing network connections failed.

2. The method of claim 1, wherein said step of determining whether said request for route discovery between the source node and the destination node over existing network connections fails comprises the step of:

determining whether the source node received a timely reply in response to the request for route discovery.

3. The method of claim 2, wherein said telecommunications network is an ad-hoc network.

4. The method of claim 3, wherein said network is a Bluetooth technology based network.

5. In an ad-hoc, radio telecommunications network that includes one or more existing subnetworks, a method for establishing a route between a source node and a destination node over which data packets are to be sent, said method comprising the steps of:

broadcasting a route discovery request message, for a route between the source node and the destination node over one or more connections associated with the one or more existing subnetworks, if the source node is a member of one or more of the existing subnetworks;

determining if a timely reply message is received by the source node in response to the broadcasting of the route discovery request message; and establishing a route between the source node and the destination node over one or more new connections associated with one or more newly formed subnetworks, if it is determined that a timely reply message was not received.

6. The method of claim 5 further comprising the step of:

establishing a route between the source node and the destination node over one or more new connections associated with one or more newly formed subnetworks, if the source node is not a member of one or more of the existing subnetworks.

7. The method of claim 5 further comprising the step of:

establishing a route between the source node and the destination node over one or more new connections associated with one or more newly formed subnetworks, if the destination node is not a member of one or more of the existing subnetworks.

8. The method of claim 5 further comprising the step of:

determining whether a route over one or more new connections associated with one or more newly formed subnetworks is desirable, if it is determined that a timely reply in response to the route discovery request message is received by the source node.

9. The method of claim 8 further comprising the step of:

establishing a route between the source node and the destination node over one or more connections associated with the one or more existing subnetworks, if it is determined that a timely reply in response to the route discovery request message is received and it is determined that a route over one or more new connections associated with one or more newly formed subnetworks is not desirable.

10. The method of claim 8 further comprising the steps of:

establishing a route between the source node and the destination node over one or more connections associated with the one or more existing subnetworks, if it is determined that a timely reply in response to the route discovery request message is received and it is determined that a route over one or more new connections associated with one or more newly formed subnetworks is desirable; and simultaneously, initiating route discovery for a route between the source node and the destination node over one or more connections associated with one or more newly formed subnetworks.

11. The method of claim 5, wherein said ad-hoc, radio telecommunications network is a Bluetooth technology based network.

12. The method of claim 11, wherein the existing and newly formed subnetworks are piconets.

* * * * *